United States Patent
Chitrakar et al.

(10) Patent No.: US 9,838,448 B2
(45) Date of Patent: Dec. 5, 2017

(54) METHOD FOR REDUCING INTERFERENCE CAUSED BY OVERLAPPING CHANNELS IN A WIRELESS COMMUNICATION SYSTEM

(71) Applicant: Panasonic Corporation, Osaka (JP)

(72) Inventors: Rojan Chitrakar, Singapore (SG); Michael Sim, Singapore (SG); Kenichi Mori, Tokyo (JP)

(73) Assignee: Panasonic Corporation, Osaka (JP)

( * ) Notice: Subject to any disclaimer, the term of this patent is extended or adjusted under 35 U.S.C. 154(b) by 402 days.

(21) Appl. No.: 14/649,147

(22) PCT Filed: Nov. 27, 2013

(86) PCT No.: PCT/JP2013/082517
§ 371 (c)(1),
(2) Date: Jun. 2, 2015

(87) PCT Pub. No.: WO2014/091971
PCT Pub. Date: Jun. 19, 2014

(65) Prior Publication Data
US 2015/0304377 A1 Oct. 22, 2015

(30) Foreign Application Priority Data

Dec. 11, 2012 (JP) .................. 2012-270380
Mar. 11, 2013 (JP) .................. 2013-048334

(51) Int. Cl.
*H04H 20/71* (2008.01)
*H04L 29/06* (2006.01)
(Continued)

(52) U.S. Cl.
CPC ......... *H04L 65/4076* (2013.01); *H04W 16/14* (2013.01); *H04W 72/082* (2013.01); *H04W 72/1215* (2013.01); *H04W 72/1278* (2013.01)

(58) Field of Classification Search
CPC .... H04W 72/08; H04W 72/082; H04W 16/14
See application file for complete search history.

(56) References Cited

U.S. PATENT DOCUMENTS

| 7,640,022 B2 | 12/2009 | Salokannel et al. |
| 8,717,983 B2 | 5/2014 | Wei et al. |

(Continued)

FOREIGN PATENT DOCUMENTS

| JP | 2012-005079 A | 1/2012 |
| JP | 2012-523186 A | 9/2012 |
| WO | 2010/124729 A1 | 11/2010 |

OTHER PUBLICATIONS

Minyoung Park et al., "Channel Access issues of OBSSs with difference coverage sizes," 11-22-1336-01-00ah- Overlapping OBSS, Nov. 12, 2012, 8 pages.

(Continued)

*Primary Examiner* — Ayaz Sheikh
*Assistant Examiner* — Sori Aga
(74) *Attorney, Agent, or Firm* — Seed IP Law Group LLP

(57) ABSTRACT

A method of reducing interference between wireless networks operating on channels with different bandwidths is proposed. One wireless network operates on a narrow band channel while the other network operates on a wide band channel that overlaps the narrow band channel. The method involves communicating information regarding the wide band channel to the devices of the network operating on the narrow band channel. A device in the network operating on the wide band channel constructs a special frame that carries its network ID as well as information regarding the wide band channel that it is operating on, namely the center frequency and the channel bandwidth. The device then broadcasts this frame on the narrow band channel. In addition, this frame is protected from possible collision by (Continued)

preceding the transmission of the frame by protection frames on both the channels.

5 Claims, 7 Drawing Sheets

(51) Int. Cl.
*H04W 16/14* (2009.01)
*H04W 72/08* (2009.01)
*H04W 72/12* (2009.01)

(56) References Cited

U.S. PATENT DOCUMENTS

| | | |
|---|---|---|
| 2010/0254344 A1 | 10/2010 | Wei et al. |
| 2012/0184206 A1 | 7/2012 | Kim et al. |
| 2012/0257574 A1 | 10/2012 | Seok et al. |
| 2013/0170423 A1 | 7/2013 | Abe et al. |
| 2014/0036805 A1* | 2/2014 | Sadek ................. H04W 52/367 370/329 |
| 2015/0180601 A1* | 6/2015 | Kim ..................... H04J 11/0056 370/329 |

OTHER PUBLICATIONS

IEEE, "Part 11: Wireless LAN MAC and PHY Specifications," Std 802.11-2012, 3 pages.
International Search Report dated Mar. 11, 2014, for corresponding International Application No. PCT/JP2013/082517, 1 page.

* cited by examiner

METHOD FOR REDUCING INTERFERENCE CAUSED BY OVERLAPPING CHANNELS IN A WIRELESS COMMUNICATION SYSTEM

TECHNICAL FIELD

The present invention generally pertains to wireless communications and, more particularly, to a method for reducing the interference caused by overlapping channels in a wireless communication system.

BACKGROUND ART

In a Wireless Communication system in which the wireless networks have a choice of operating on channels with different channel bandwidth, the likelihood of one wireless network operating on a wide bandwidth overlapping another wireless network operating on a narrow bandwidth is high. Here, the spectrum of the narrow band channel forms a portion of the wide band channel.

In situations where the interference between the two networks is high, one possible solution to reduce the interference could be to move one or both networks to non-overlapping channels, provided such channels exist. Both networks will become aware of the interference, possibly due to deteriorating throughput or by other means. It is relatively easier for a device operating on the wide channel to determine the exact characteristics of the narrow band channel by using techniques including but not limited to FFT analysis. On the other hand, due to limitations such as channel-filter etc., placed on the receiver of the devices operating on the narrow band channel, it is much harder for these devices to correctly detect the exact characteristics of the wide band channel. In all wireless communication systems, the number of available wide band channels is limited and in many cases might even be limited to one. In such cases, where there does not exist an alternative wide band channel, it makes more sense for the network operating on the narrow band channel to shift to another non-overlapping channel.

Traditionally, if the controller device of a network (an AP of a WLAN network, or a base station of a cell) wants to switch channels, it needs to perform various forms of scans (energy detection, active/passive beacon detection etc.) in order to determine which of the available channels is best. The controller device can spend substantial amount of time and energy in this process. If the controller device had a prior knowledge of the exact characteristics of the interfering wide band channel, it can save substantial time and energy in the scan process since it can safely skip scanning the channels overlapped by the wide band channel.

CITATION LIST

Patent Literature

PTL1: U.S. Pat. No. 7,640,022(B2) Techniques for interference reduction in wireless communication networks, Juha Salokannel et al.
PTL2: WO2010/124729(A1) Spectrum arrangement for co-channel interference reduction
PTL3: US2012/0184206(A1) Method and apparatus for reducing inter-cell interference in a wireless communication system
PTL4: US2012/0257574(A1) Method of reducing interference between stations in Wireless LAN system, and apparatus supporting the same

Non Patent Literature

NPL1: IEEE STD 802.11-2012

SUMMARY OF INVENTION

Technical Problem

Summary of Patent document 1: The interference between two networks occur due to overlapping of scheduled transmission time slots. The proposed solution involves communicating the interference situation by one network to another network by means of regular beacon frames and requesting the other network to change its transmission time slot so as to avoid the interference. The proposed solution does not solve our problem since a network operating on a channel with different bandwidth is not able to receive beacon frames of another network.

Summary of Patent document 2: Interference occur between two frequency channels, one of them being wider than the other and the narrow channel overlapping one end of the frequency spectrum of the wider channel. Proposed solution does not involve any communication between the two networks. Solution is based on limiting the transmission on the wider channel to the non-overlapping portion of the frequency spectrum. This approach is different from our proposed solution.

Summary of Patent document 3: Interference occurs between a Macro cell and a Micro cell. Solution involves negotiating a time schedule during which communication may occur between the two cells. One cell may send a request to the other cell to reduce its transmit power in order to reduce the effects of the interference. Means to negotiate such inter-cell communication schedule does not exist in our case.

Summary of Patent document 4: The proposed solution involves the use of sounding PPDUs to gather information regarding interfering channel and using beam-forming techniques to reduce interference. Proposed solution technique is very different from ours.

Summary of Non-patent document 1: Under section 9.3.2.7 Dual CTS protection, mechanism of protecting a STBC data frame in the presence of non-STBC STAs is described. The reverse case of protecting a non-STBC data frame in the presence of STBC STAs is also described. This protection mechanism is not suitable for the scenario described in this text where the two networks are operating on channels with different channel bandwidths.

An object of the present invention is to provide a method of avoiding/reducing interference between two overlapping wireless communication systems operating on overlapping channels of different channel bandwidths and an apparatus to implement the method.

Objects of the present invention are not limited to that described above and other objects will be clear to people skilled in the art from the description of the invention in the following sections.

Solution to Problem

As an example, a method of avoiding/reducing the interference between two overlapping wireless communication systems operating on overlapping channels of different channels is provided. The method is summarized in the flowchart 600 presented in FIG. 7. The process starts at 602 when a first wireless network operating on wide band channel is interfered by a second wireless network operating a narrow band channel that is completely overlapped by the wide band channel. In step 604 the controller/coordinator device of the first network detects the presence of the interference and attempts, with finite number of retries, to gather information regarding the interfering channel in step 606. In step 608, if the information gathering in step 606 was successful and that the controller device was able to determine that the interfering channel is of a narrower bandwidth, the controller device proceed to step 610. Otherwise, if the controller device was not able to gather interfering channel information in step 606, or that the interfering channel was determined to be not of a narrower bandwidth, the controller device may proceed to fall back on alternative interference mitigation mechanisms (step 609) that is beyond the scope of the patent. In step 610 the controller device constructs a special frame which may be called "Interference Notification" frame. The frame comprises of information regarding the first network like a unique network ID, center frequency, channel bandwidth etc. In step 612, the controller device confirms that both the wide band as well as the narrow band channels is idle and proceeds to transmit a protection frame with a proper duration setting on its own channel. The purpose of this protection frame is to prevent transmission of any other frames in the wide band channel within the stipulated duration. In step 614, after waiting for a short interval, the controller device proceeds to transmit another protection frame with a proper duration setting on the narrow band channel. In step 616, after waiting another short interval, the controller device proceeds to transmit the "Interference Notification" frame on the narrow band channel. In step 618, a device in the interfering network receives the "Interference Notification" frame and becomes aware of the existence of the first network. It then proceeds to report this information to the controller device of its own network. In step 620, based on this information, the controller device of the interfering network selects an alternative non-overlapping channel and moves the network to this channel, thereby removing the interference condition.

In addition, an apparatus to implement the method described above is also presented.

Advantageous Effects of Invention

An advantage of the present invention is the substantial saving in energy and time for a network to select an alternative channel in the event of heavy interference from a neighboring network.

Advantages of the present invention are not limited to that described above and other advantages will be clear to the people skilled in the art.

DESCRIPTION OF EMBODIMENTS

The following description is based on embodiments of the invention and should not be taken as limiting the invention with regard to alternative embodiments that are not explicitly described herein.

First Embodiment

Figure 1:
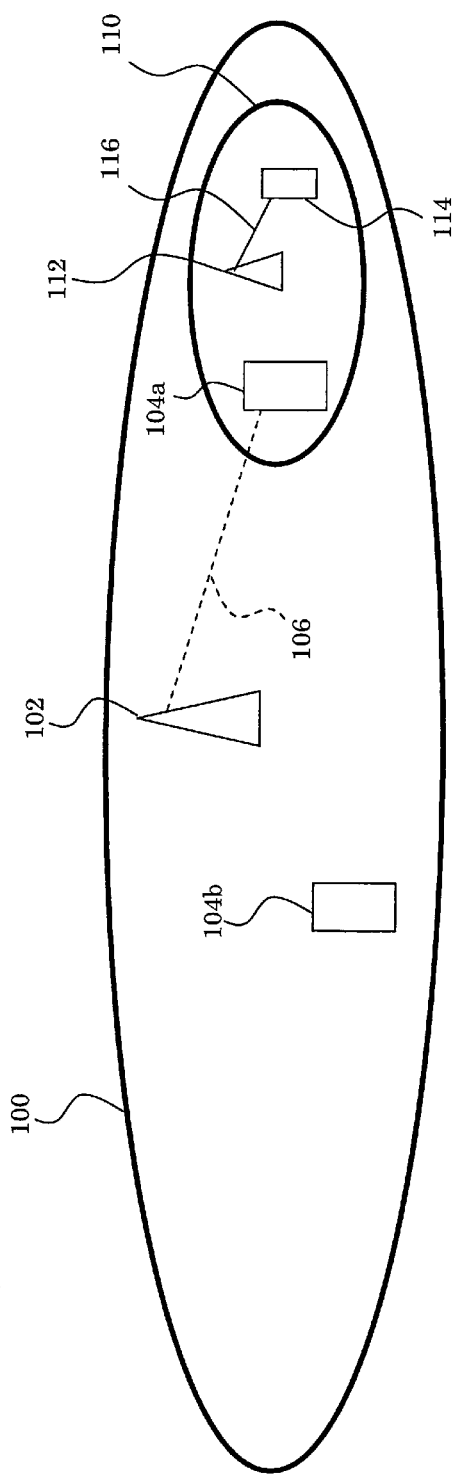
FIG. 1 shows an example environment where the invention presented might be applied. Two overlapping wireless communication networks, one running on a wide band channel, and one running on a narrow band are shown.

FIG. 1 shows an example environment where the present invention may be applied. The environment includes two Wireless LAN (WLAN) networks also called Basic Service Set (BSS), an extended range BSS 100, and a short range BSS 110. Each BSS contain at least one Access Point (AP) and one or more stations (STA). The extended range BSS 100 comprises one AP 102 and two STAs 104a and 104b. The short range BSS 110 comprises one AP 112 and one STA 114. As seen in FIG. 1, the extended range BSS 100 completely overlaps the short range BSS 110 and forms an Overlapping Basic Service Set (OBSS). Furthermore, one of the STA 104a belonging to the extended range BSS 100, is also within the transmission range of the AP 112 of the short range BSS 110. As an example, the extended range BSS 100 can be an extended range WiFi hotspot, with range up to 1 km. The short range BSS 110 on the other hand can be a home WiFi network with range less than 100 meters. The channel used for the wireless communication in the extended range BSS 100 is represented by the dotted line 106 while the channel used for the wireless communication in the short range BSS 110 is represented by the solid line 116.

Figure 2:
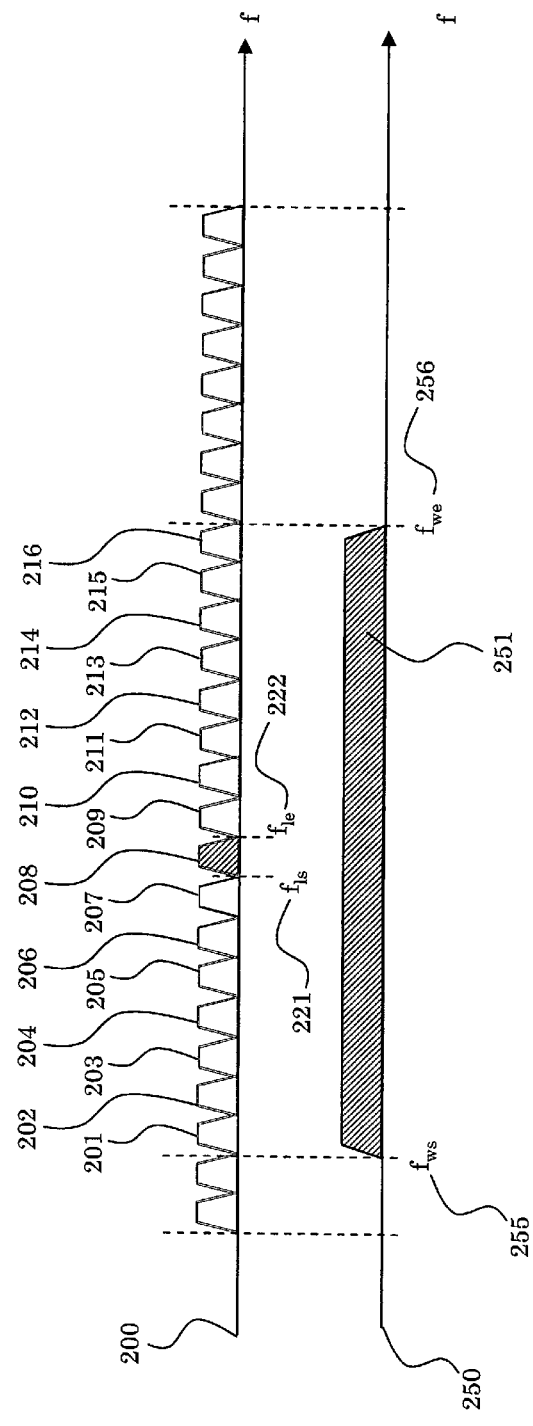
FIG. 2 is a diagram of available channels of two frequency spectrums, one narrow band and one wide band.

FIG. 2 shows the frequency spectrum of the two BSSs. The extended range BSS 100 is operating on the narrow band channels 208, which is one of the available narrow band channels in the frequency spectrum 200. Similarly, the short range BSS 110 is operating on a wide band channel 251 in the frequency spectrum 250. Here, the narrow band channel 208 is completely overlapped by the wide band channel 251 i.e. both the starting frequency 221 ($f_{1s}$) and the ending frequency 222 ($f_{1e}$) of the narrow band channel 208 lies between the starting frequency 225 ($f_{ws}$)and the ending frequency 256 ($f_{we}$) of the wide band channel 251. In addition, all the narrow band channels 201, 202, 203, 204, 205, 206, 207, 209, 210, 211, 212, 213, 214, 215 and 216 are also overlapped by the wide band channel 251.

Figure 5:
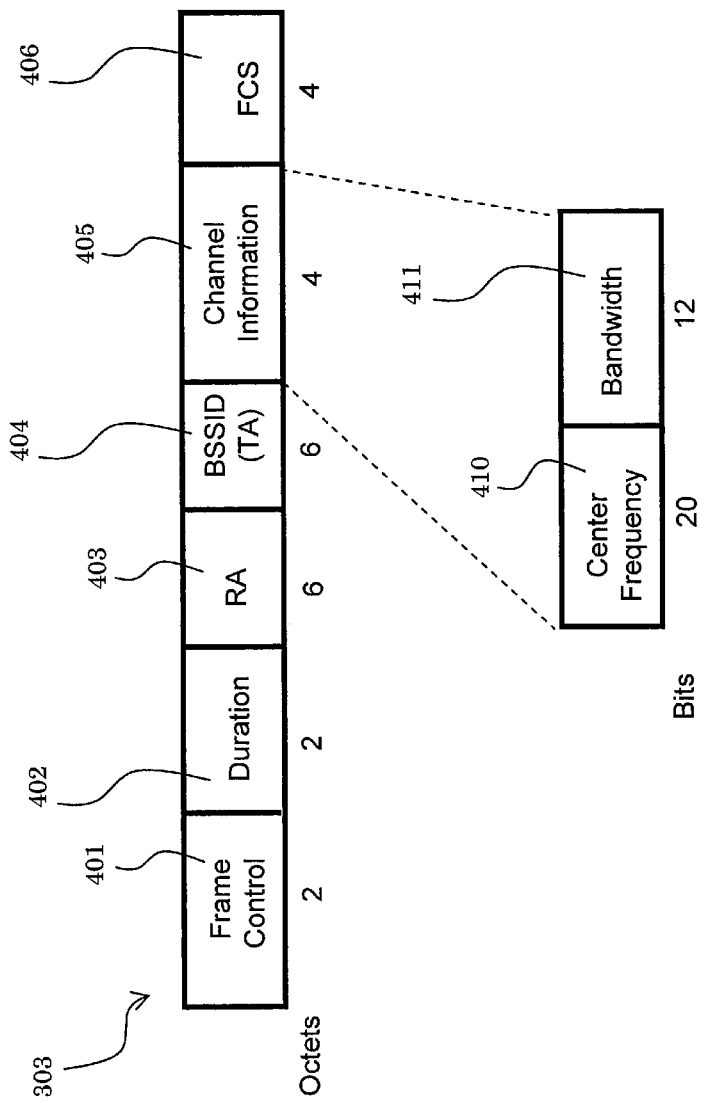
FIG. 5 is the structure of the proposed "Interference Notification" frame.

Due to this overlapping of the operating frequencies, any wireless communications on either channels will interfere with the communication on the other channel. For example, data transfer between AP 102 and STA 104a on link 106 will affect data transfer between AP 112 and STA 114 on link 116 and vice versa. Since the two links are operating on two different channel band widths, the devices partaking in the communication might not become immediately aware of this interference, but this interference will be manifested as a reduction in the throughput, increased retransmissions etc. on one or both links. If this interference is very heavy, communication on both links will deteriorate heavily. The situation is more critical for the short range BSS 110 since all the devices in it will be affected, where as for the extended range BSS 100, only the devices that are within the transmission range of AP 112 are affected. Since wider band channels are more scarce in numbers, in many instances there might be only one wide band channel in a given frequency spectrum where as there can be many narrow band channels as shown in FIG. 2. In such a circumstance, even upon becoming aware of the interference, the short range BSS 110 might have only two options to mitigate the interference: One, it can move itself to a narrower band channel that does not overlap the narrow band channel 208; or Two, it can request the interfering BSS 100 to move to another narrow band channel that does not overlap with the wide band channel 251 for e.g. any of the narrow band channels shown in FIG. 2. aside from channels 201, 202, 203, 204, 205, 206, 207, 208, 209, 210, 211, 212, 213, 214, 215 and 216. To accomplish this, the short range BSS 110 has to be able to somehow communicate this request to the extended range BSS 100. As of the present, there does not exist any explicit mechanism to accomplish this kind of inter-BSS communication. A new control frame called "Interference Notification" frame 303 is proposed for this purpose and the structure of the frame is described in FIG. 5. The fields of the frame comprise as one example: Frame Control field 401, Duration field 402, Receiver Address (RA) field 403, BSSID field 404, Channel Information field 405 and the FCS field 406. The Frame Control field 401, Duration field 402 and the FCS field 406 are construction following the same rules used in construction other control fields. The Receiver Address (RA) field 403 shall be set as the broadcast MAC address and the BSSID field 404 is the network ID of the BSS. The most unique element of the "Interference Notification" frame 303 is the Channel Information field 405, which explicitly identifies the channel that the BSS is operating on. The Channel Information field 405 is made up of the sub-fields Center Frequency 410, which specifies the center frequency of the BSS channel and the sub-field Bandwidth 411, which specifies the bandwidth of the BSS channel.

Figure 3:
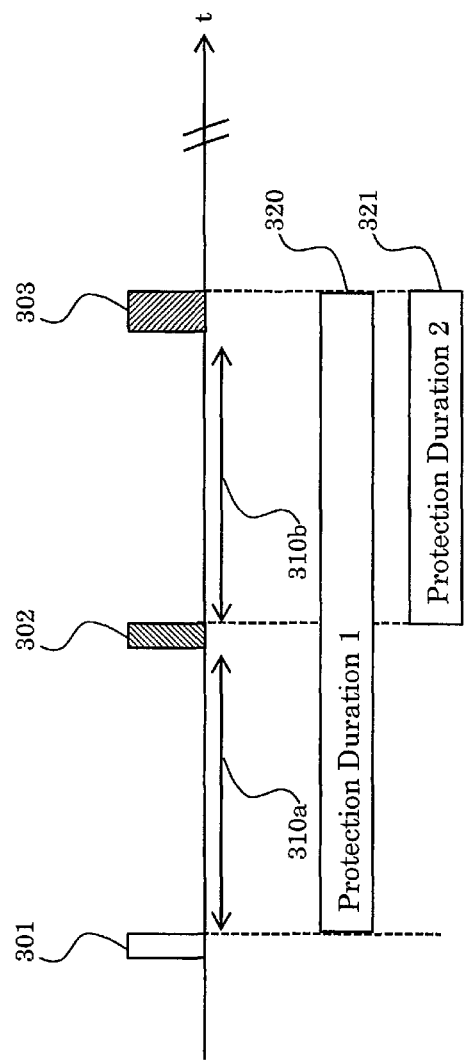
FIG. 3 shows the frame exchange sequence proposed.

FIG. 3 describes the frame sequence involved in transmitting the "Interference Notification" frame 303. Due to presence of OBSS, the probability of the transmission of the "Interference Notification" frame 303 failing is reasonably high. In order to increase the success rate of the transmission, the "Interference Notification" frame 303 needs to be protected in both the wide band channel 251 as well as the narrow band channel 208. This is achieved by the AP 112 gaining access to the medium on both the wide band channel as well as the narrow band channel by using appropriate channel access procedures and then transmitting a CTS-to-self frame 301, addressed to itself in the wide band channel 251. In this embodiment, the CTS-to-self frame 301 is transmitted using the default Modulation and Coding Scheme (MCS) used for transmitting control frames in the short range BSS 110. A CTS-to-self frame is a standard CTS frame with its Receiver Address (RA) field set to the transmitting device's own MAC address. The protection duration 320 of the CTS-to-self frame 301 is set as the sum of the time intervals 310a and 310b and the transmission times of the CTS-to-self frame 302 and the "Interference Notification" frame 303. The time intervals 310a and 310b are set as one Short Interframe Space (SIFS). The time intervals 310a and 310b may have the same duration, or each the time intervals 310a and 310b may have different duration. All the devices in the short range BSS 110 can receive the CTS-to-self frame 301. Since the Receiver Address (RA) field of the CTS-to-self frame 301 does not match the MAC address of the device receiving the frame, the device will set its Network Allocation Vector (NAV) to the duration 320 set in the CTS-to-self frame 301. In this manner, all the devices in the short range BSS 110, except the AP 112, are restricted from transmitting any frame for the entire duration required to complete the frame sequence shown in FIG. 3. After a time interval 310a equal to one SIFS, the AP 112 transmits another CTS-to-self frame 302, addressed to itself in the narrow band channel 208. In this embodiment, this CTS-to-self frame 302 is transmitted using the default MCS used for transmitting control frames in the extended range BSS 100. All the devices that belong to the extended range BSS 100 within the transmission range of AP 112 can receive the CTS-to-self frame 302. Since the Receiver Address (RA) field of the CTS-to-self frame 302 does not match the MAC address of the device receiving the frame, the device will set its Network Allocation Vector (NAV) to the duration 321 set in the CTS-to-self frame 302. In this manner, all the devices belonging to the extended range BSS 100 which are within the transmission range of AP 112, are restricted from transmitting any frame for the duration 321 set in the CTS-to-self frame 302. The protection duration 321 of the CTS-to-self frame 302 is set as the sum of the time interval 310b and the transmission time of the "Interference Notification" frame 303. After a time interval 310b equal to one SIFS, the AP 112 finally transmits the "Interference Notification" frame 303 in the narrow band channel 208. In this embodiment, this "Interference Notification" frame 303 is transmitted using the default MCS used for transmitting control frames in the extended range BSS 100. The "Interference Notification" frame 303 is received by the STA 104a belonging to the extended range BSS 100, which is also within the transmission range of the AP 112 of the short range BSS 110. Upon inspecting the BSSID field 404 of the "Interference Notification" frame 303, the STA 104a will become aware of the existence of the OBSS caused by the short range BSS 110. The STA 104a can report this to its AP 102 by using some reporting mechanism and it will include the information regarding the interfering channel in this report. AP 102, upon receiving this report from STA 104a can start the process to find an alternative channel that is not overlapped by the wide band channel 251. This process may involve various forms of scans (energy detection, active/passive beacon detection etc.) in order to determine which of the available channels is best. Due to the explicit information regarding the wide band channel that was communicated by means of the "Interference Notification" frame 303, namely the center frequency and the channel bandwidth, the AP 102 can skip scanning channels 201, 202, 203, 204, 205, 206, 207, 208, 209, 210, 211, 212, 213, 214, 215 and 216 since they are all overlapped by the wide band channel 251 and concentrate its scanning efforts on the remaining channels. This a priori knowledge of the exact characteristics of the interfering wide band channel can save substantial time and energy for AP 102 in the scan process since it can safely skip scanning the channels overlapped by the wide band channel.

Figure 6:
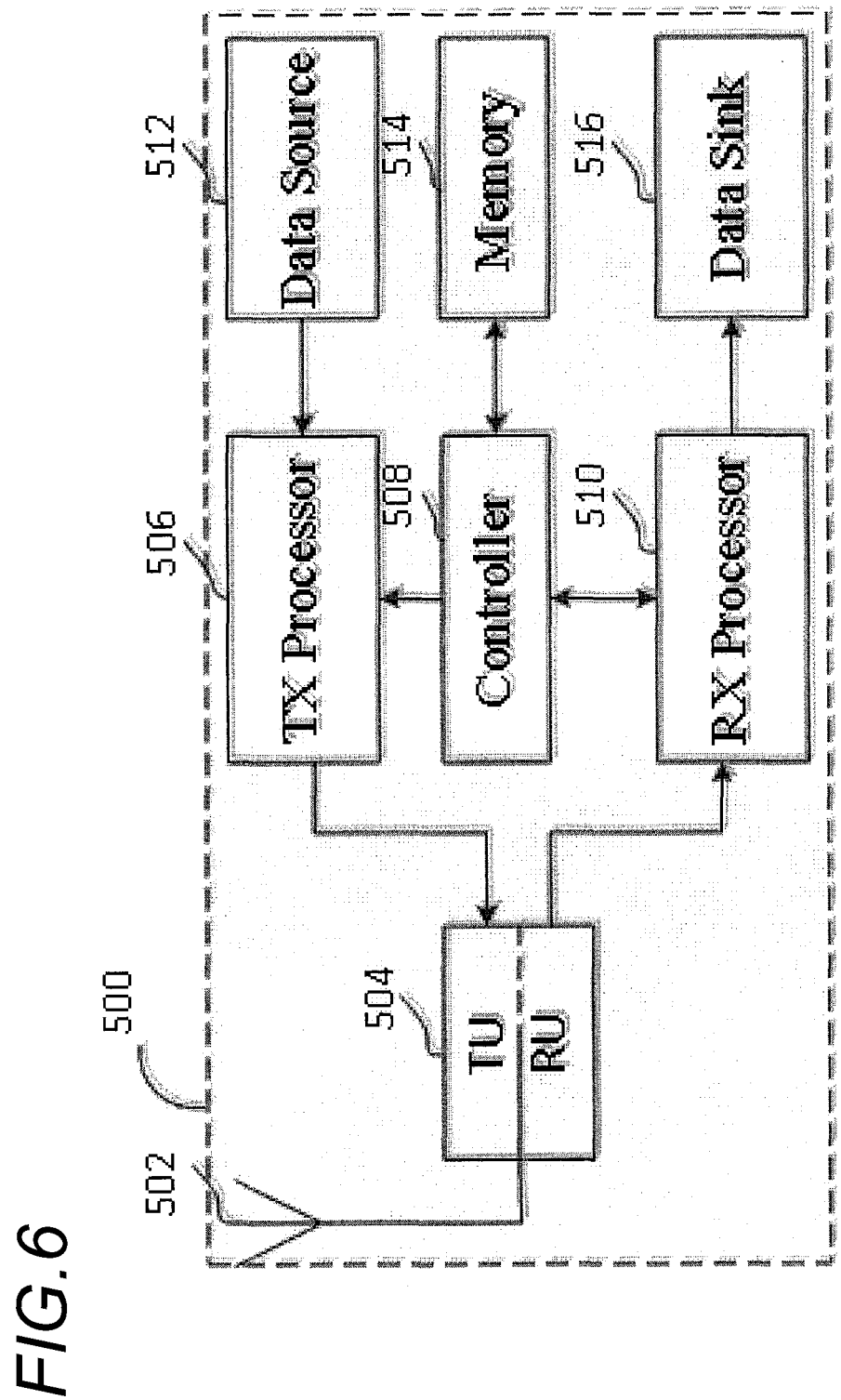
FIG. 6 is the block diagram of a device that implements the proposed invention.
Figure 7:
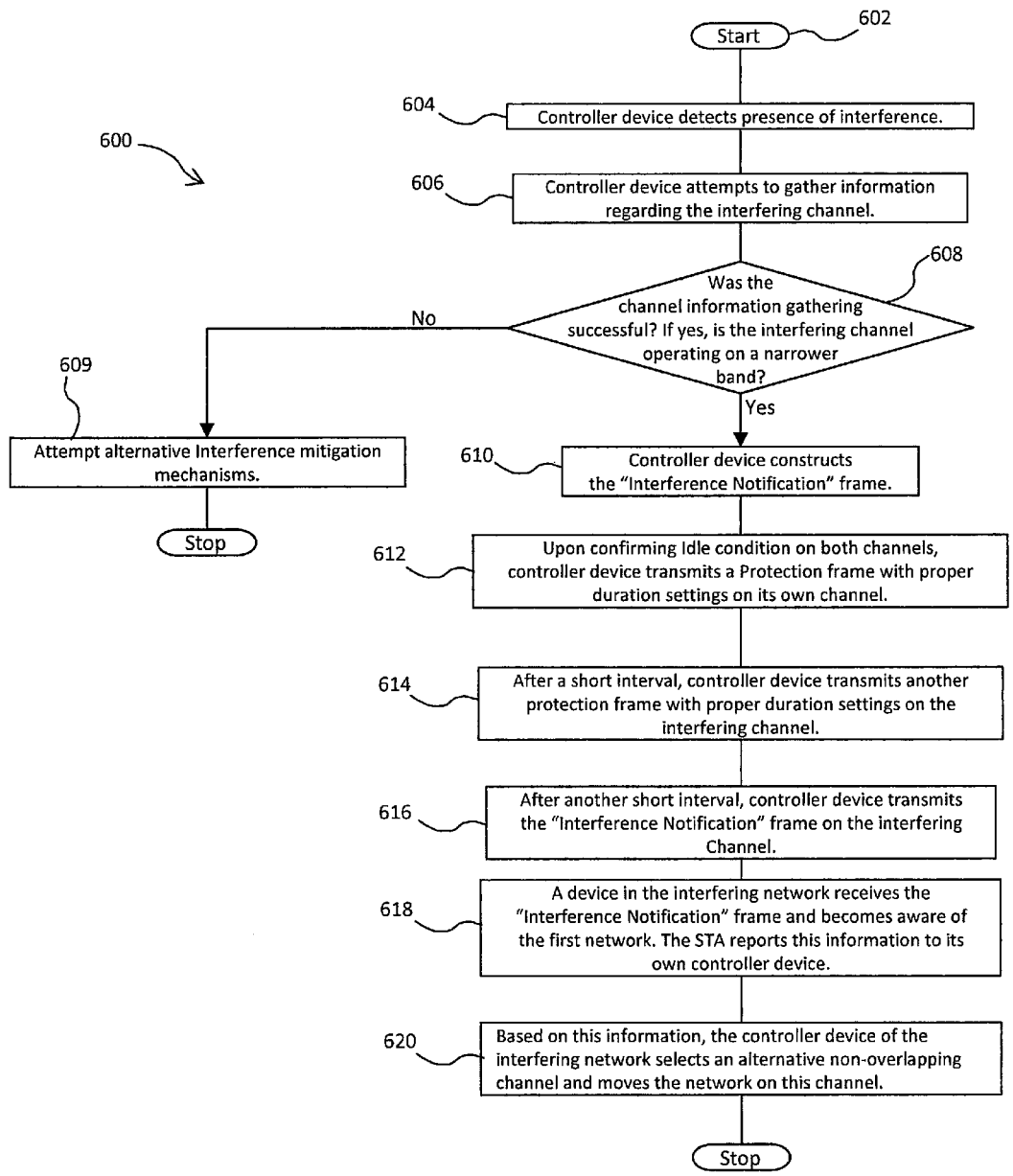
FIG. 7 is a flowchart describing the sequence of action involved in the proposed invention.

The method described above may be implemented by an wireless apparatus 500 as shown in FIG. 6. The wireless apparatus 500 may be an AP or a non-AP STA. The wireless apparatus 500 includes an RF antenna 502, a Transmit/Receive unit 504, a TX processor 506, a RX processor 510, a central controller 508, a Data Source 512, a Data Sink 514 and also memory 514. The RF antenna 502 is responsible for transmitting and receiving radio signals, the Transmit/Receive unit 504, is responsible for putting the bitstream to be transmitted onto the air as well as receive the incoming radio signals into bitstream. The TX processor 506 takes the responsibility of converting the various frames passed by the MAC layer into a bitstream to be passed to the Transmit/Receive unit 504, while the RX processor 510 assumes the responsibility of the incoming bitstream from the Transmit/Receive unit 504 and passing the relevant information to the MAC layer. The MAC layer is implemented by the central controller 508. Depending on the type of MAC program loaded on central controller 508, the wireless apparatus acts either as an AP or as a non-AP STA.

Second Embodiment

According to the second embodiment of the present invention, while all the procedures described in the first embodiment remain the same, the CTS-to-self frame 301, the CTS-to-self frame 302 and the "Interference Notification" frame 303 are all transmitted at the lowest possible MCS value.

Third Embodiment

Figure 4:
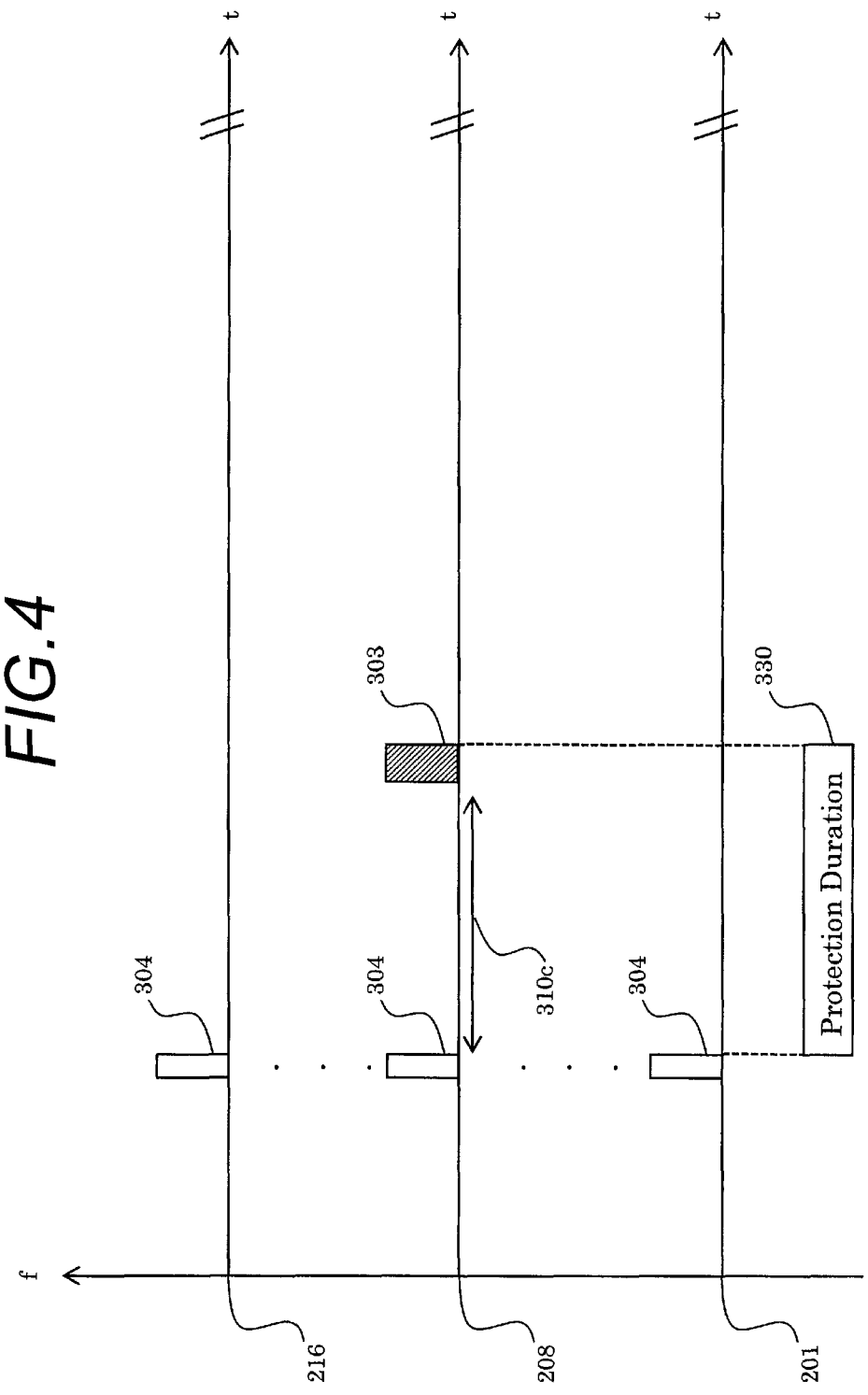
FIG. 4 shows an alternative frame exchange sequence that may be used instead of the frame exchange sequence depicted in FIG. 3.

According to the third embodiment, while all other procedures described in the first embodiment remain the same, the procedures of the frame exchange sequence are replaced with the following explanation referring to FIG. 4.

FIG. 4 describes an alternative frame sequence involved in transmitting the "Interference Notification" frame 303. Due to presence of OBSS, the probability of the transmission of the "Interference Notification" frame 303 failing is reasonably high. In order to increase the success rate of the transmission, the "Interference Notification" frame 303 needs to be protected in both the wide band channel 251 as well as the narrow band channel 208. This is achieved by the AP 112 gaining access to the medium on each of the narrow band channels that are overlapped by the wide band channel 251 by using appropriate channel access procedures and then simultaneously transmitting the CTS-to-self frames 304 addressed to itself in each of the narrow band channels that are overlapped by the wide band channel 251. In this embodiment the CTS-to-self frame 304 is transmitted using the default Modulation and Coding Scheme (MCS) used for transmitting control frames in the short range BSS 110. The protection duration 330 of the CTS-to-self frame 304 is set as the sum of the time interval 310c and the time required to transmit the "Interference Notification" frame 303 in the narrow band channel 208. The time interval 310c is set as one Short Interframe Space (SIFS). Furthermore, the CTS-to-self frame 304 is transmitted by AP 112 at maximum TX power to ensure that all the devices within the maximum transmission range of AP 112 can receive the CTS-to-self frame 304. Since the Receiver Address (RA) field of the CTS-to-self frame 304 does not match the MAC address of the device receiving the frame, the device will set its Network Allocation Vector (NAV) to the duration 330 set in the CTS-to-self frame 304. In this manner, all the devices within the maximum transmission range of AP 112, except the AP 112 itself, are restricted from transmitting any frame for the entire duration 330 required to complete the frame sequence shown in FIG. 4. After a time interval 310c equal to one SIFS, the AP 112 finally transmits the "Interference Notification" frame 303 in the narrow band channel 208 at maximum TX Power. In this embodiment, this "Interference Notification" frame 303 is transmitted using the default MCS used for transmitting control frames in the short range BSS 110. AP 102, upon receiving the "Interference Notification" frame 303, becomes aware of the existence of the OBSS caused by the short range BSS 110. AP 102 can start the process to find an alternative channel that is not overlapped by the wide band channel 251. This process may involve various forms of scans (energy detection, active/passive beacon detection etc.) in order to determine which of the available channels is best. Due to the explicit information regarding the wide band channel that was communicated by means of the "Interference Notification" frame 303, namely the center frequency and the channel bandwidth, the AP 102 can skip scanning channels 201, 202, 203, 204, 205, 206, 207, 208, 209, 210, 211, 212, 213, 214, 215 and 216 since they are all overlapped by the wide band channel 251 and concentrate its scanning efforts on the remaining channels. This a priori knowledge of the exact characteristics of the interfering wide band channel can save substantial time and energy for AP 102 in the scan process since it can safely skip scanning the channels overlapped by the wide band channel.

Fourth Embodiment

According to the fourth embodiment of the present invention, while all the procedures described in the third embodiment remain the same, the CTS-to-self frame 304 and the "Interference Notification" frame 303 are all transmitted at the lowest possible MCS value.

Fifth Embodiment

According to the fifth embodiment of the present invention, while all the procedures described in the third embodiment remain the same, the CTS-to-self frame 304 and the "Interference Notification" frame 303 are all transmitted at default MCS used for transmitting control frames in the extended range BSS 100.

This application is based upon and claims the benefit of priority from the prior Japanese Patent Applications No. 2012-270380 which was filed on Dec. 11, 2012 and No. 2013-048334 which was filed on Mar. 11, 2013, the entire contents of which are incorporated herein by reference.

The invention claimed is:

1. A method for reducing interference between neighboring wireless networks operating on channels with different bandwidths, comprising the steps of:
   detecting, by a first device in a first network, interference from a device on a second network, wherein the said second network is operating on a channel band that forms a part of the channel band that the said first network operates on;
   constructing, by the said first device, an interference notification frame for notifying the presence of the said first network;
   broadcasting, by the said first device, on the channel that the said second network operates on, the said interference notification frame;
   protecting, by the said first device, the broadcast of the said interference notification frame from collision on the channels of both networks by precluding the said interference notification frame with transmission of appropriate protection frames on the channels of both networks; and
   detecting, by a second device in the said second network, the presence of the said first network upon receiving the said interference notification frame.

2. The method according to claim 1, wherein the said interference notification frame comprises:
   a network ID uniquely identifying the said first network;
   the center frequency of the channel that the said first network operates on; and
   the bandwidth of the channel that the said first network operates on.

3. The method according to claim 1, wherein the said second network tries to find another available channel band that does not overlap with the channel band that the said first network operates on based on the said interference notification frame to avoid the said interference while the said first network tries to keep using the original channel band.

4. The method according to claim 2, wherein the said interference notification frame further comprises:

a network ID uniquely identifying the said second network.

5. A wireless communication device configured to reduce interference between neighboring wireless networks operating on channels with different bandwidths, comprising:

a first module on a first device in a first network, configured to detect interference from a device on a second network, wherein the said second network is operating on a channel band that forms a part of the channel band that the said first network operates on;

a second module on the said first device, configured to construct an interference notification frame for notifying the presence of the said first network; and a third module on the said first device, configured to broadcast, on the channel that the said second network operates on, the said interference notification frame;

wherein the third module on the said first device is further configured to protect, the broadcast of the said interference notification frame from collision on the channels of both networks by precluding the said interference notification frame with transmission of appropriate protection frames on the channels of both networks; and wherein the first module also be implemented by a second device in the said second network, to detect the presence of the said first network by receiving the said interference notification frame.

* * * * *